United States Patent [19]

Takahashi et al.

[11] Patent Number: 5,065,985
[45] Date of Patent: Nov. 19, 1991

[54] METHOD FOR SMELTING REDUCTION OF IRON ORE AND APPARATUS THEREFOR

[75] Inventors: Kenji Takahashi; Katsuhiro Iwasaki; Shigeru Inoue; Haruyoshi Tanabe; Masahiro Kawakami; Kenzo Yamada; Osamu Terada, all of Tokyo, Japan

[73] Assignee: NKK Corporation, Tokyo, Japan

[21] Appl. No.: 520,785

[22] Filed: May 8, 1990

Related U.S. Application Data

[62] Division of Ser. No. 276,612, Nov. 28, 1988, Pat. No. 5,000,789.

[30] Foreign Application Priority Data

Nov. 30, 1987 [JP] Japan .................. 62-303940
Feb. 9, 1988 [JP] Japan .................. 63-28584
Feb. 9, 1988 [JP] Japan .................. 63-28586

[51] Int. Cl.⁵ .................. C21C 5/38
[52] U.S. Cl. .................. 266/156; 266/217; 266/265
[58] Field of Search .................. 266/144, 156, 219, 217, 266/265; 75/532, 551, 501, 502

[56] References Cited

U.S. PATENT DOCUMENTS 4,504,311 3/1985 Weiner .................. 75/532
4,889,323 12/1989 Pasch et al. .................. 266/156
4,936,908 6/1990 Takahashi et al. .................. 75/502
4,995,906 2/1991 Iwasaki et al. .................. 75/502

FOREIGN PATENT DOCUMENTS 61-43406 9/1986 Japan .

Primary Examiner—S. Kastler
Attorney, Agent, or Firm—Frishauf, Holtz, Goodman & Woodward

[57] ABSTRACT

An apparatus for a smelting reduction of iron ore comprising a preheat and prereduction furnace which preheats and prereduces iron ore, a smelting reduction furance into which said preheated and prereduced iron ore, carbonaceous material and fluxes are charged and in which said preheated and prereduced iron ore are smelted and reduced, a top blow oxygen lance having decarburizing nozzles and post-combustion nozzles and blowing oxygen into said smelting reduction furance, and at least one side tuyere placed at a side wall of the smelting reduction furnace and at least one bottom tuyere placed at a bottom of the smelting reduction furnace through which a stirring gas is respectively blown so that at least a part of said stirring gas introduced through said at least one side tuyere hits a swollen portion of the molten metal by said stirring gas introduced through said at least one bottom tuyere.

12 Claims, 3 Drawing Sheets

METHOD FOR SMELTING REDUCTION OF IRON ORE AND APPARATUS THEREFOR

This is a division of application Ser. No. 07/276,612, filed Nov. 28, 1988, now U.S. Pat. No. 5,000,789, issued Mar. 19, 1991.

BACKGROUND OF THE INVENTION

1. Field of the Invention

The present invention relates to a method for smelting reduction of iron ore, and particularly to a method wherein carbonaceous material is used as both of fuel and a reducing agent and the iron ore which is being smelted and reduced in a basic oxygen furnace and an apparatus therefor.

2. Description of the Related Arts

Smelting reduction method has recently been developed as a substitution for a blast furnace iron-making method, to overcome some disadvantages in that the blast furnace iron-making method requires not only an expensive construction cost but also a vast construction site.

In a prior art smelting reduction method, iron ore is prereduced by means of an exhaust gas, and then the pre-reduced iron ore is charged together with carbonaceous material and flux into a smelting reduction furnace. Furthermore, oxygen gas and stirring gas are blown into the smelting reduction furnace. Thus, the carbonaceous materials is smelted thanks to the pre-charged molten metal and, at the same time, C contained in the carbonaceous material is oxidated by the oxygen gas. Through the heat produced by this oxidation, the ore is smelted and reduced by means of C contained in the carbonaceous materials. CO gas generating in the molten metal is post-combusted, by the oxygen gas excessively blown, into $CO_2$ gas. The sensible heat of this $CO_2$ gas is transferred to slag and iron particles in the slag covering the surface of the molten metal, and then, to the molten metal.

In this way, the iron ore is reduced to the molten metal. In this process, in order to lighten the load of reduction process in a smelting reduction furnace, iron ore is prereduced, for example, at a reduction degree of 60 to 75% before the iron ore is charged into the smelting reduction furnace as disclosed in a Japanese Examined Patent Publication No. 434 06/86. Resultantly, an exhaust gas from the smelting reduction furnace becomes a low oxidated gas which is highly reductive and a large amount of the exhaust gas is forced to be required.

If iron ore before being charged into the smelting reduction furnace is prereduced at a ratio of at least 30% for the purpose of the lightening the load of reduction process of smelting reduction furnace, an oxidation degree(hereinafter referreto as "OD") of the exhaust gas from the smelting reduction furnace, where the OD is represented by the formula of "$(H_2O+CO_2)/(H_2+H_2O+CO+CO_2)$" is required to be lowered. Resultantly the amount of the exhaust gas is necessarily increased, as shown, for example, in the Japanese Examined Patent Publication No. 43406/86. This increase of the exhaust gas, naturally, increases the production cost. Consequently, to obtain the high prereduction ratio of the iron ore, the exhaust gas having a low OD as explained above is required, and still the retention time of the iron orestaying in the prereduction furnace has to become longer than that in the smelting reduction furnace. Therefore, it becomes difficult to control the balancing of cycles of charge of the prereduced iron ore and discharge of the produced molten metal. This necessarily results in restricting control range strictly in the smelting reduction furnace.

Furthermore, in order to raise a melting speed of iron ore and to obtain the speed-up of reduction of the iron ore, a method of post-combusting CO gas in the smelting reduction furnace and making use of the heat generated therefrom has conventionally been employed, wherein $O_2$ gas for post-combustion is introduced through tuyeres placed at upper wall of the smelting reduction furnace. However, in the conventional method, although the temperature of the exhaust gas can be elevated when the ratio of the post-conbustion is raised, the sensible heat transfer to the molten metal is not sufficient. This results in being forced to discharge high temperature exhaust gas. This method has a difficulty in that such a high temperature gas will attack the inner refractory wall of the smelting reduction furnace.

Therefore, it has been hitherto a generally conceived that the OD of the exhaust gas cannot be raised so much.

SUMMARY OF THE INVENTION

In the light of the mentioned difficulty, it is an object of the present invention to provide a method for smelting reduction of iron ore wherein an efficiency of heat transfer is attained, the inner refractory wall is well protected from the heat attack due to the post-combusted $CO_2$, an efficient preheat and prereduction is obtained and a reasonable operational performance is guaranteed.

In accordance with the present invention, a method is provided for smelting reduction of iron ore, comprising the steps of:

preheating and prereducing iron ore;

charging the preheated and prereduced iron ore, carbonaceous material and flux into a smelting reduction furnace;

blowing oxygen gas through a top blow oxygen lance having decarburizing nozzles and post-combustion nozzles into the smelting reduction furnace, an end of said top blow oxygen lance being arranged between an upper level of and a lower level of a slag layer;

blowing a stirring gas through at least one side tuyere placed at the side wall of the smelting reduction furnace and at least one bottom tuyere placed at the bottom wall of the reduction furnace so that at least a part of the stirring gas introduced through the at least one side tuyere hits a swollen portion of the molten metal which is made by the stirring gas introduced through the at least one bottom tuyere;

said stirring gas being at least one selected from the group consisting of Ar, $N_2$, CO, $CO_2$ and a process gas;

controlling a flow rate of the oxygen gas and the stirring gas blown in the smelting reduction furnace so that OD of an infurnace gas generated from the smelting reduction furnace ranges 0.5 to 1.0.

Furthermore, in accordance with the present invention, an apparatus for the mentioned method is provided, comprising:

a preheat and prereduction furnace which preheats and prereduces iron ore;

a smelting reduction furnace into which the preheated and prereduced iron ore, carbonaceous material and flux are charged and in which the iron ore is smelted and reduced;

a top blow oxygen lance having decarburizing nozzles and post-combustion nozzles and blowing oxygen gas into said smelting reduction furnace;

at least one side tuyere placed at a side wall of the smelting reduction furnace and at least one bottom tuyere placed at a bottom of the smelting reduction furnace through which a stirring gas is respectively blown so that at least a part of said stirring gas introduced through said at least one side tuyere hits a swollen portion of the molten metal by said at least one bottom tuyere.

The object and other objects and advantages of the present invention will become apparent from the detailed description to follow, taken in conjunction with the appended drawings.

DESCRIPTION OF THE PREFERRED EMBODIMENT

Figure 1:
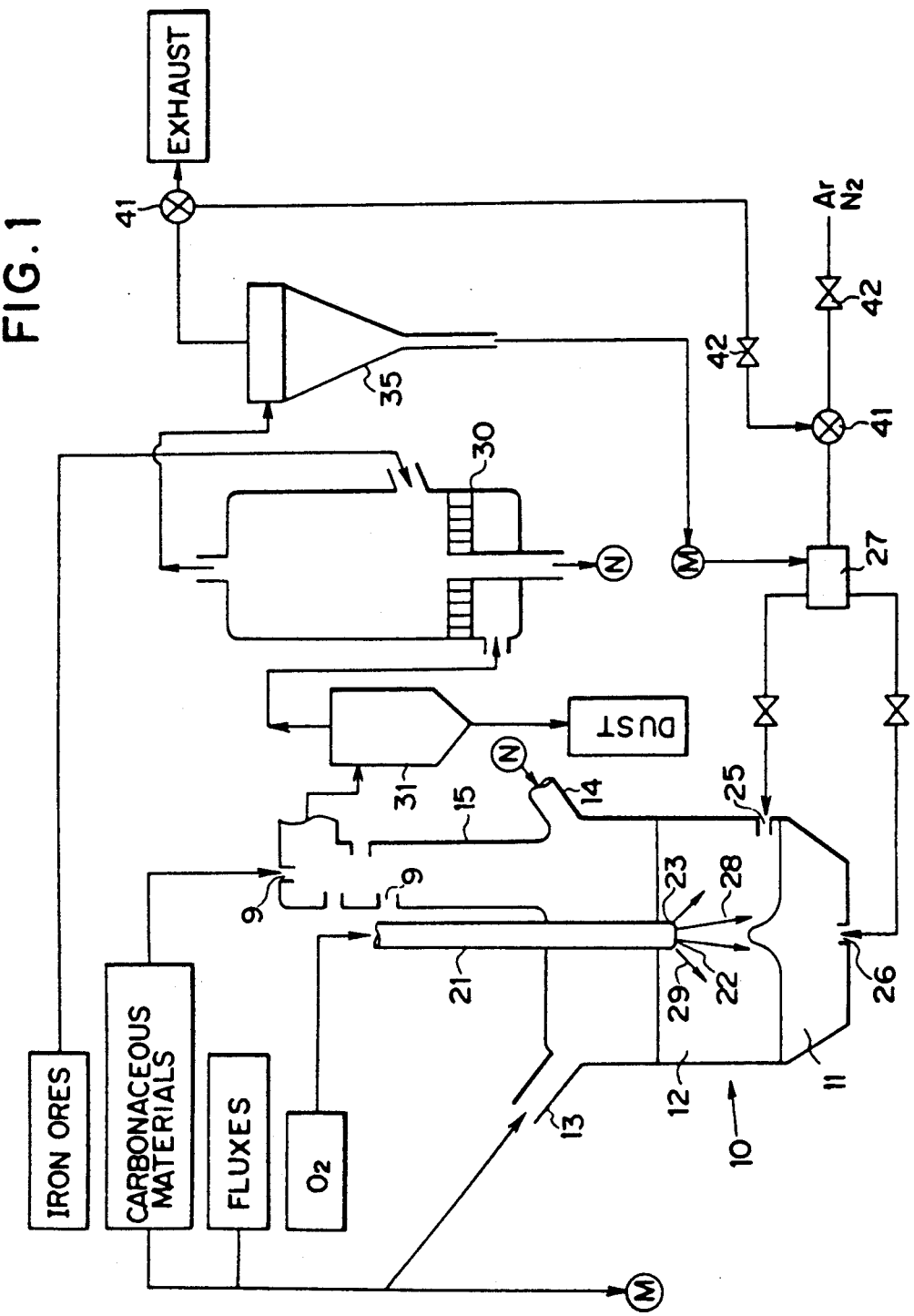
FIG. 1 is a block diagram illustrating an embodiment of an apparatus for smelting reduction of iron ore of the present invention.

The inventors obtained some findings, based on the study of the mechanism of the smelting reduction furnace and the measures specifically responding to improvement in the heat transfer efficiency and to promotion of the reduction of iron ore.

① According to the basic concept in the prior arts as mentioned above, the post-combustion ratio cannot be greatly improved due to the technological limit in improving the heat transfer efficiency and damage of the inner walls of the smelting reduction furnace due to the post-combustion super heat. However, if oxygen gas is blown into a slag layer and, at the same time, the slag is strongly stirred so that the post-combustion is performed mainly within the slag layer, the high degree of post-combustion can be procured, the high heat transfer efficiency being maintained. Thus, thanks to the high degree of post-combustion, slag and molten metal shots contained in slag are well heat-supplied so that the reduction of iron ore by C represented in the formula given below proceeds efficiently, where C means carbon contained in the molten metal, either in shape of metal droplets or metal bath.

$$Fe_2O_3 + 3C \rightarrow 2Fe + 3CO$$

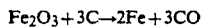 In the prior art method, there are some examples wherein oxygen bottom blow is carried out during the whole or a certain period of the reduction operation. Such oxygen bottom blow is disadvantageous to the high degree of post-combustion. Namely, when the oxygen bottom blow is carried out, a large amount of CO gas is produced in molten metal and the molten metal is strongly stirred. Resultantly, splash of the molten metal goes into a post-combustion zone and C contained in the splashed molten metal reacts with the oxygen gas, thereby the post-combustion ratio being lowered. Consequently, it is necessary to avoid the oxygen bottom blow, regardless of the period of the blowing.

Based on these knowledge and experience, the present invention enables an efficient reduction operation, setting the following conditions:

(a) Side blowing and bottom blowing of stirring gas are combined so that molten metal is actively diffused into the zone where iron ore exists in a slag layer and the reduction work of iron ore by C contained in the molten metal is promoted.

(b) Decarburization nozzles and post-combustion nozzles are placed in a top blow oxygen lance and oxygen gas is blown therethrough so that a predetermined OD level or more is procured. The oxygen gas through the post-combustion nozzeles is introduced into the slag layer to form, in the slag layer, a zone where the post-combustion is carried out. The slag layer is strongly stirred by a side blow gas as well as by a top blow gas. Thus, the heat generated by the post-combustion is transferred to iron ore.

(c) As stirring gas blown, through the side wall as well as bottom wall, at least one selected from the group consisting of Ar, $N_2$, CO, $CO_2$ and a process gas is used so as for the post-combustion degree not to go down. Oxygen gas is not used for this purpose.

In addition to the foregoing, in the present invention, powdery carbonaceous material, fuel oil or steam is blown through an upside wall portion or an upper portion of side walls of the smelting reduction furnace, a gas exhaust pipe for an exhaust gas provided with the reduction furnace or gas upgrading tuyeres at a preheat and prereduction furnace. This blowing upgrades gases generated in the smelting reduction furnaces to lower an OD of the generated infurnace gases, and those upgraded gases contribute to a high prereduction degree. The temperature of the exhaust gas is controlled to preferably ranges 300° to 1,300° C. If the temperature is less than 300° C., the preheat effect is not expected and in addition, it fears that the tar trouble occurs during the process of upgrading the gases. Contrarily, if it is over 1,300° C., there is a problem of heat resistance in the equipment. Furthermore, it is also advantageous in the heat resistance of the equipment to lower the temperature by means of upgrading the gases.

Now referring specifically to the appended drawings, an embodiment of an apparatus for smelting reduction of iron ore of the present invention will be described. FIG. 1 illustrates a block diagram of an apparatus for smelting reduction of iron ore of the present invention. In FIG. 1, two M s mean that one of the two M s is connected to the other and two N s mean that one of the two N s is connected to the other. In smelting reduction furnace 10, molten metal bath 11 and slag layer 12 are formed. The smelting reduction furnace has top blow oxygen lance 21 inserted down perpendicularly into it. At the end of the top blow oxygen lance, decarburizing nozzles 22 and post-combustion nozzles 23 are placed to blow oxygen gas into furnace 10. In side walls and a bottom wall of furnace 10, there are respectively placed side tuyere 25 and bottom tuyere 26 through which a gas is blown as stirring gas. The gas is at least one selected from the group consisting of Ar, $N_2$, CO, $CO_2$ and a process gas. The process gas is a gas generated from an apparatus for smelting and reducing iron ore according to the present invention.

At upper portions of furnace 10, first chute 13 and second chute 14 are respectively mounted. Through first chute 13, carbonaceous material and flux which are supplied from an ordinary material feeder (not shown-for simplification), and through second chute 14, iron ore which is already prereduced in fluid bed type preheat and prereduction furnace 30, are respectively charged, by gravity, into the smelting reduction furnace. Gas exhaust pipe 15 for an exhaust gas discharged from furnace 10 is attached thereto. It should be noted that the fluid bed type preheat and prereduction furnace can be alternated by a shaft type furnace having a high heat efficiency or by a rotary kiln type furnace enabling an equipment cost reduction and an easy operation without any obstacle to the performance of the present invention.

At upper portions of said gas exhaust pipe, one or more gas upgrading tuyeres 9 are placed, through which powdery carbonaceous material, fuel oil or steam is blown, as a gas upgrading agent which upgrades the exhaustgas into a gas having a low OD value. Furthermore, there are provided hot cyclone 31 into which an exhaust gas is introduced from smelting reduction furnace 10 and which removes dust from the exhaust gas without losing the high heat of the exhaust gas, preheat and prereduction furnace 30, into which the exhaust gas is introduced and which preheats iron ore by means of the introduced exhaust gas, and separator 35 which receives the exhaust gas from the preheat and prereduction furnace and removes fine paticles of the iron ore included in the exhaust gas. There is also pressure means 27 which mixes the fine particles of the iron ore separated from the iron ore in separator 35 with a carrier gas to form a mixture and applies a pressure to the mixture. The mixture is blown into furnace 10 through side tuyeres 25 and bottom tuyeres 26. Switch-over valve 41 and shut-off valve 42 are provided to use the exhaust gas generated from separator 35 as a process gas. It should be noted that a prat of the fine particles of the iron ore can also be returned to preheat and prereduction furnace 30 as iron ore to be preheated and prereduced, although not shown in FIG. 1. Furthermore, in view of making use of heat, it is effective to arrange a preheater in stead of separator 35, and to preheat the iron ore. As the carrier gas, a gas selected from the group consisting of Ar, $N_2$, CO, $CO_2$ and a process gas can be used.

Secondly, a method for smelting reduction of iron ore which is used in an apparatus for smelting reduction as explained in the foregoing will be described. Iron ore, as raw material, is charged into preheat and prereduction furnace 30 from said material feeder (not shown) and, after being preheated and prereduced in furnace 30, the iron ore is charged, by grabity, into smelting reduction furnace 10 through second chute 14. Carbonaceous material and fluxes are also charged, by gravity, into furnace 10 through first chute 13. In the smelting reduction furnace, molten metal bath 11 and slag layer 12 are formed. An infurnace gas generated from smelting reduction furnace 10 in the slag layer 12 increases its OD by an infurnace reaction which is hereinafter explained in detail. The infurnace gas ascends up through gas exhaust pipe 15, being bound for preduction furnace 30, and this infurnace gas to be an exhaust gas meets with a gas upgrading agent, which is bound to be blown into gas exhaust pipe 15 through gas upgrading tuyere 9 arranged at an upper portions of gas exhaust pipe 15. This upgrading of the exhaust gas is also hereinafter explained in detail.

The influence gas which has been increased, due to the infurnace reaction, in OD represented by the formula given below is decreased, by means of gas upgrading agent, in the OD:

$$OD=(H_2O+CO_2)/(H_2+H_2O+CO+CO_2) \qquad (1)$$

The infurnace gas thus upgraded quality is introduced, as an exhaust gas, into preheat and prereduction furnace 30. The iron ore is preheated and prereduced in the preheat and prereduction furnace, and then, is charged into the smelting reduction furnace through second chute 14. In the meantime, the exhaust gas goes into separator 35 and, after fine particles of iron ore are separated from the exhaust gas in the separator, the exhaust gas proceeds, by means of switch-over valve 41 and shut-off valve 42, on either of two courses. One of the two course is that the exhaust gas is exhausted through an ordinary gas exhauster, and the other is that the exhaust gas is used as a process gas, which is blown through side tuyeres 25 and bottom tuyeres 26 into furnace 10, to be a stirring gas or a carrier gas. Furthermore this exhaust gas can be introduced into gas exhaust pipe 15 to be mixed with the infurnace gas exhausted from the smelting reduction furnace and can be used to control a temperature of a gas which is introduced into preheat and prereduction furnace 30.

Figure 2:
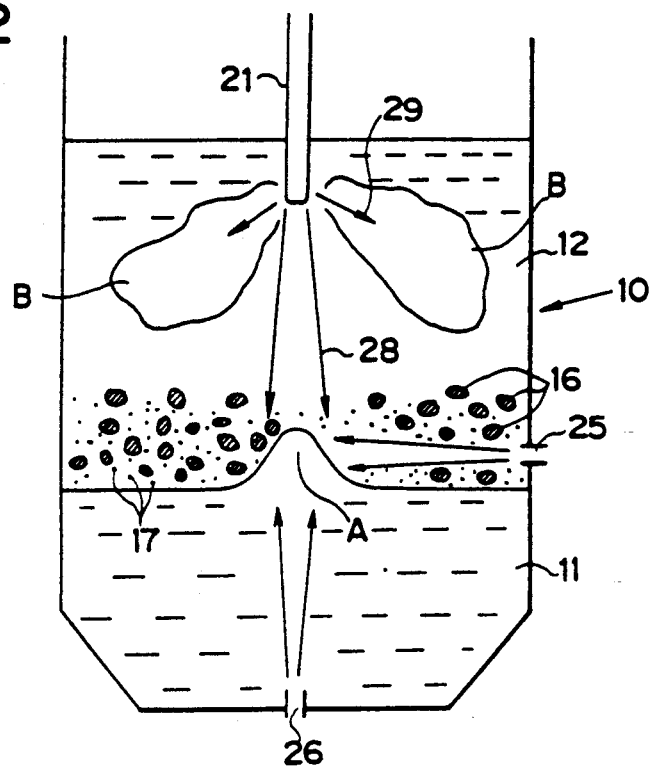
FIG. 2 is a view illustrating a gas flow in a smelting reduction furnace forming a part of the apparatus shown in FIG. 1.

Now, with specific reference to the drawings of FIGS. 2 to 6, relation between gas blow into smelting reduction furnace 10 and infurnace reaction will be examined in detail. FIG. 2 schematically illustrates a behavior of gas blown through side tuyeres 25 and bottom tuyeres 26 shown in FIG. 1. In FIG. 2, arrows 28 and 29 illustrated below oxygen lance 21, each, show directions of oxygengas injected respectively through decarburizing nozzles 22 and post-combustion nozzles 23.DC $O_2$ denotes oxygen gas blown through the decarburizing nozzles and PC $O_2$ oxygen gas blown through the post-combustion nozzles. Throughout the reduction operaton, gas blow operation through oxygen lance 21, side tuyere 25 and bottom tuyere 26 is carried out from the beginning to the end of the operation. The gas blow through the side tuyeres and the bottom tuyeres is co-worked to diffuse molten metal into slag, and resultantly, the gas blow increases drastically a reduction speed.

As mentioned in the beginning of the detailed description, based on the finding that reduction of iron ore existing in slag layer 12 proceeds mostly by making use of C contained in molten metal as a reducing agent, the present invention intends to diffuse molten metal actively into the zone where iron ore is floating in a lower portion of the slag layer by means of strong stirring to raise the reduction speed. For this purpose, a swollen portion of molten metal (shown by A in FIG. 2) is formed on the surface of the molten metal by blowing a stirring gas through bottom tuyere 26 and simultaneously, a stirring gas is blown in through side tuyere 25 so as to have at least a part of the side blown stirring gas hit portion A. By this side blow gas, molten metal at the swollen portion of A is splashed into the slag. An apparent specific gravity of the slag ranges normally 0.1 to 0.5, while a bulk specific gravity of the iron ore ranges approximately 2 to 5. Consequently, iron ore 16 contained in the slag is floating concentratedly in a lower portion of slag layer 12. When the swollen portion of A of the molten metal is splashed by means of the side blown stirring gas, splashed molten metal 17 is diffused into a zone of a lower portion of slag layer 12. C contained in the splashed molten metal reduces the iron ore. Thus, a high reduction speed is performed. To obtain such an effect, it is preferable that the side blowgas hits portion A of the molten metal so as for the bottom blow gas and the side blow gas to cross at right angles each other as much as possible. In the horizontal direction, side tuyeres 25 and bottom tuyeres 26 are placed so as to satisfy a positional relation as shown in (a) or (b) of FIG. 3.

Figure 3A:
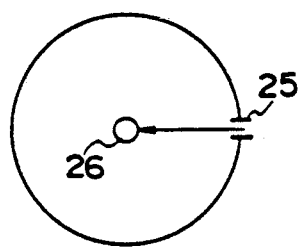
FIG. 3 is a view illustrating a position relation between side tuyeres and bottom tuyeres of the present invention.
Figure 3B:
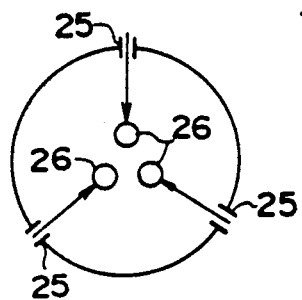

FIG. 3(a) illustrates a positional relation in case that one side tuyere 25 and one bottom tuyere 26 are used, and FIG. 3(b) illustrates a positional relation in case that three side tuyeres 25 and three bottom tuyeres 26 are used. In this FIG. 3, arrows show directions of gas blown through side tuyeres 25. Of course, the number and the position of side tuyeres 25 and bottom tuyeres 26 are not always subject soley to those shown in FIG. 3. The number is determined, depending on a capacity of smelting reduction furnace in use and an amount of production thereof. Furthermore a large amount of gas is required to be blown through both of side tuyeres 25 and bottom tuyeres 26. The amount of the gas blows is determined, depending on an amount of molten metal and a depth of the molten metal. In addition to the diffusion work, the side blow gas stirs an upper portion of slag layer where a zone of the post combustion is formed. This is also hereinafter detailed.

Gas blown-in through side tuyeres 25 and bottom tuyeres 26 is at least one selected from the group consisting of $N_2$, Ar, CO, $CO_2$ and a process gas. $O_2$ gas, however, is never used. The reason is as follows: Firstly, if $O_2$ gas is used as the side blow gas, this involves a fundamental problem that reduction work of C containedin molten metal which has been splashed into a lower portion of slag layer 12 is impaired. Secondly, if $O_2$ gas is used as the bottom blow gas, CO gas is produced so much that the molten metal is too strongly stirred. As a result, the splash of the molten metal goes into a zone of an upper portion of the slag layer and reaches to a post-combustion zone (shown by B in FIG. 2) where combustion by PC $O_2$ takes place. Consequently, the post-combustion is impaired because C contained in the molten metal reacts with $O_2$ to be used for the the post-combustion. Furthermore, the use of $O_2$ gas for the bottom blow raises the temperature of refractory forming bottom tuyeres 26 so high that cooling gas such as $C_3H_3$ is required to be added. This addition also increases the amount of the bottom blow gas and accelerates occurrence of the splash of the molten metal excessively.

Figure 4:
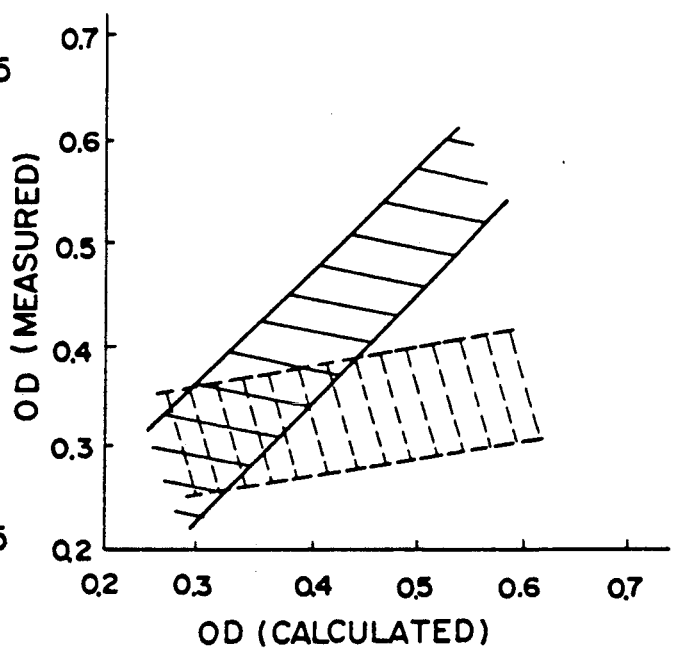
FIG. 4 is a graphic representation showing comparison of OD calculated according to the present invention with OD actually measured.

FIG. 4 is a graphic representation showing a comparison of examples of the present invention to controls of the prior art, the examples using $N_2$ gas as the bottom blow gas and the controls using $O_2$ gas in stead of $N_2$ gas as the bottom blow gas. Namely, in this graph, the OD measured which is represented by the ordinate corresponds to an OD which is obtained from the formula (1) hereinbefore using analy of $H_2O$, $CO_2$, $H_2$ and CO contained in the exhaust gas. On the other hand, the OD which is represented by the abscissa is given by formula (2):

$$OD = [PC\ O_2/(DC\ O_2 + PC\ O_2 + O_2\ \text{in Iron ore} + \quad (2)$$
$$O_2\ \text{in Carbonaceous Material} + \text{Water Adhered to Material} +$$
$$\frac{1}{2} \cdot O_2\ \text{in Carbonaceous Material})]$$

This is based on the assumption that the numerator "PC $O_2$" is completely consumed in the post-combustion and that all of $O_2$ blown in the smelting reduction furnace is discharged, as an exhaust gas, out of the smelting reduction furnace. In case of the controls, $O_2$ gas introduced by bottom blow is included in DC $O_2$. OD determined on a theoretically calculated basis is gained, by means of formula (2), from measured amount of DC $O_2$ and PC $O_2$ and amount of $O_2$ and $H_2$ included in raw material which is obtained by analysis. When, as seen from the examples, a measured OD is nearly equal to a calculated OD, it can be said that the post-combustion ratio is good. As clealy seen from FIG. 4, the post-combustion of the examples is good, but that of the controls is poor.

In the present invention, the post-combustion zone is formed mainly within slag i.e. zone B and the high degree of post-combustion is performed. In this way, by a method wherein the post-combustion zone is formed and the slag is strongly stirred by the side blow gas, it can be attained that the high degree of post-combustion is procured and still the high heat transfer is obtained. Consequently, the post-combustion oxygen gas needs to be blown mainly into slag existing in the post-combustion area of zone B.

It is specifically reqired that a level of a top-blow lance is set so as to have an appropriate level height relative to a molten metal level and a slag level. In other words, if nozzles of oxygen lance 21 are excessively higher than the upper surface of slag layer 12, the post-combustion zone fails to be formed in the slag layer and the heat transfer efficiency is lowered, while if the nozzles are excessively low, the post-combustion zone fails to be appropriately formed. The lowest level of the nozzles of the oxygen lance is equal to the lower side of the slag layer.

Figure 5:
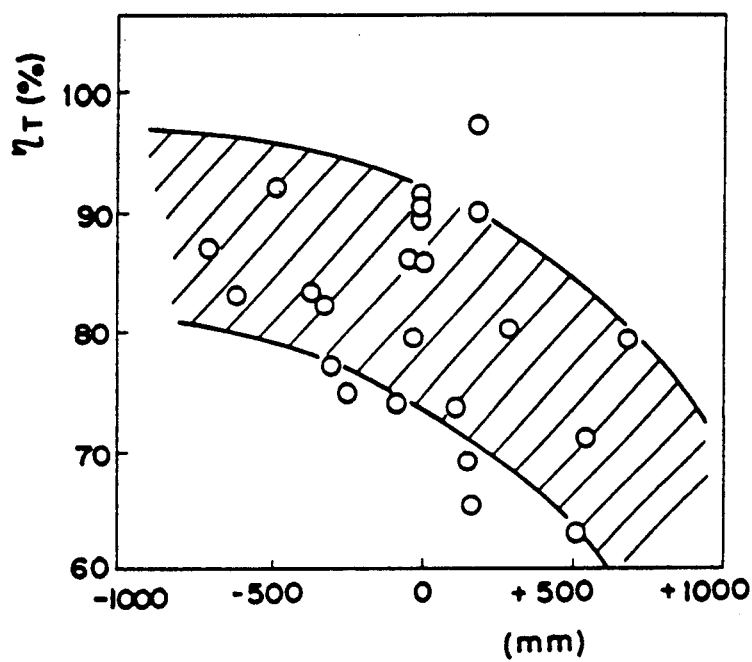
FIG. 5 is a graphic representation showing a relation of a heat transfer efficiency to a level height of an oxygen lance of the present invention.
Figure 6:
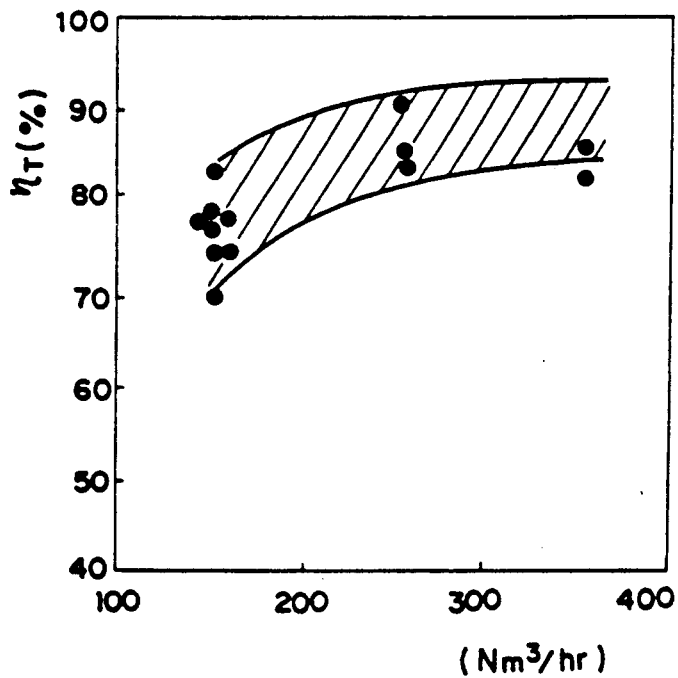
FIG. 6 is a graphic representation showing a relation of a heat transfer efficiency to a side blow gas of the present invention.

FIG. 5 shows a relation of a height between the top end of oxygen lance and the upper surface level of slag to the heat transfer efficiency according to the present invention, teaching that if the top end of the oxygen lance is too high from the slag surface, the good heat transfer efficiency cannot be obtained. FIG. 6 shows a relation of a side blow gas amount to the heat transfer efficiency. It is recognized from FIG. 6 that a good heat transfer efficiency can be obtained by blowing a large amount of the side blow gas through side tuyeres 25 and stirring strongly the slag layer. The results shown in FIGS. 5 and 6 were obtained from an operation wherein a smelting reduction furnace with 50 tons in capacity was employed and molten metal was produced at a rate of 28 t/hour.

According to the present invention, thanks to the high heat efficiency, a high reduction rate can be gained by means of increasing the OD as mentioned above. In addition to this, thanks to the raise of the OD, the addition amount of carbonaceous material can be reduced. Resultantly, a unit consumption of carbonaceous material can be saved and, at the same time, P content in molten metal can be reduced since most of P in the molten metal is brought with the carbonaceous material. Furthermore, when the OD becomes high, desulfurization by evaporation is activated, and therefore, S content in the molten metal can be reduced. From these view points, the OD is set preferably to be 0.5 or more. If the OD is 0.7 or more, the reduction reaction in the smelting reduction furnace is promoted and the prereduction furnace becomes remarkably needless.

In the manner as mentiond above, gas with an increased OD i.e., gas of low calories is upgraded, by means of blowing powdery carbonaceous material, which is an upgrading agent, together with a carrier gas through gas gas upgrading tuyeres 9 placed at an upper portion of gas exhaust pipe 15, into an upgraded gas having a less than 0.5 OD. This upgraded gas is introduced into preheat and prereduction furnace 30 and iron ore can be efficiently prereduced. The carrier gas is at least one selected from the group consisting of $N_2$, Ar, CO, $CO_2$ and a process gas. Powdery carbonaceous material as mentioned above, which is a gas upgrading agent, is usually blown in together with a carrier gas. Depending on a particle size of carbonaceous material, however, they can be charged, by gravity, into gas upgrading tuyeres 9. This can also apply to charging through an upper portion of the smelting reduction furnace. It is recommendable that as said gas upgrading agent, fuel oil or steam can be used, by taking into consideration conditions such as cost, a structure of the gas upgrading tuyeres and the exhaust gas.

In this embodiment, as mentioned above, gas upgrading tuyeres 9 are placed at an upper portion of the smelting reduction furnace. This arrangement enables a lot of positions of the blow inlets to freely be selected vertically along the wall of gas exhaust pipe 15, and therefore, amount of blow-in gas can be easily controlled. Furthermore, when those tuyeres are placed at an upside wall and upper portion side walls of the smelting reduction furnace, those portions of the smelting reduction furnace, gas exhaust pipe and other attachments thereto can be protected from being overheated since the blow-in of the gas upgrading agent lowers the temperature of the exhaust gas. When the preheatand prereduction furnace is of fluid bed type, by means of blowing the gas upgrading agent into a wind box, the gas upgrading agent and the exhaust gas from the smelting reduction furnace are well mixed in the wind box, and the grade up of the exhaust gas is efficiently carried out.

Lastly, specific values obtained from the results of the operation of the examples of the present invention are listed in Table 1. These examples were obtained on the same conditions as those of FIGS. 5 and 6. In the Table, comparison of a case of the gas upgrading being carried out and a case of the gas upgrading not being carried out is shown. The respective OD values were calculated by formula(2) given hereinbefore, using the compositions of the exhaust gases in table 1. The OD value of the upgraded gas is 0.24, while the OD of the non-upgraded gas is 0.51. It is clear that the upgraded gas has an OD value much lower than that of the non-upgraded gas. Furthermore the temperature of the upgraded gas is lower than that of the non-upgraded gas.

While the present invention has been particularly showen and described with reference to preferred embodiments thereof, it will be understood by those skilled in the art that the foregoing and other changes in form and details can be made therein without departing from the spirit and scope of the present invention.

TABLE 1

|  | Non-upgraded Gas | Upgraded Gas |
|---|---|---|
| Coal | 328 kg/min (in molten metal bath) | 225 kg/min (in molten metal bath) |

TABLE 1-continued

|  | Non-upgraded Gas | Upgraded Gas |
|---|---|---|
| Iron Ore | 724 kg/min (in molten metal bath) | 76 kg/min (for upgrading) 720 kg/min (in molten metal bath) |
| $CaCO_3$ | 72 kg/min (in molten metal bath) | 74 kg/min (in molten metal bath) |
| $O_2$ | 232 $Nm^3$/min | 165 $Nm^3$/min |
| Exhaust Gas |  |  |
| CO | 44% | 68% |
| $CO_2$ | 34% | 14% |
| $H_2$ | 5% | 8% |
| $H_2O$ | 17% | 17% |
| Temp. | 1,740° C. | 1,650° C. |

What is claimed is:

1. An apparatus for a smelting reduction of iron ore comprising:
   a preheat and prereduction furnace means for preheating and prereducing iron ore;
   a smelting reduction furnace means into which preheated and prereduced iron ore from said preheat and prereduction furnace means, carbonaceous material and flux are charged and in which said preheated and prereduced iron ore is smelted and reduced, said smelting reduction furnace means having a bottom wall and side walls;
   a top blow oxygen lance having decarburizing nozzles and post-combustion nozzles at one end thereof for blowing oxygen into molten metal contained in said smelting reduction furnace means;
   at least one side tuyere disposed in a side wall of the smelting reduction furnace means and at least one bottom tuyere disposed at the bottom of the smelting reduction furnace means through which a stirring gas is blown through molten metal contained in the smelting reduction furnace means to cause a portion of the upper surface of the molten metal to swell upwardly, at least a part of said stirring gas blown through said at least one side tuyere being directed at the upwardly swollen portion of the molten metal to agitate said molten metal; and
   at least one upgrading tuyere through which a gas upgrading agent is blown to an infurnace gas generated from said smelting reduction furnace means, said upgrading tuyere being disposed in a gas exhaust pipe which leads the infurnace gas from the smelting reduction furnace means to the preheat and prereduction furnace means.

2. The apparatus of claim 1, wherein said preheat and prereduction furnace means is a fluid bed furnace.

3. The apparatus of claim 1, wherein said preheat and prereduction furnace means is a shaft furnace.

4. The apparatus of claim 1, wherein said preheat and prereduction furnace means is a rotary kiln.

5. The apparatus of claim 1, wherein the decarburizing nozzles and post-combustion nozzles of the top blow lance are disposed in a layer of molten slag in the smelting reduction furnace means.

6. The apparatus of claim 1, wherein said decarburizing nozzles are disposed at a central portion of a tip of said oxygen lance and said post-combustion nozzles are spaced outwardly from said decarburizing nozzles.

7. The apparatus of claim 6, wherein the at least one bottom tuyere is disposed in a central portion of the bottom of said smelting reduction furnace means.

8. The apparatus of claim 1. which further comprises a pressure means which mixes said fine particles of said iron ore from said separator means with gas for delivery to said side tuyeres and said bottom tuyeres.

9. The apparatus of claim 1, wherein said oxygen top blow lance is mounted substantially at the center of the smelting and reduction furnace means.

10. The apparatus of claim 1, wherein said apparatus further comprises a means for separating dust from an exhaust gas discharged from the preheat and prereduction furnace means and a means for blowing the separated dust to the smelting reduction furnace means.

11. An apparatus for a smelting reduction of iron ore comprising:

- a preheat and prereduction furnace means for preheating and prereducing iron ore;
- a smelting reduction furnace means into which preheated and prereduced iron ore from said preheat and prereduction furnace means, carbonaceous material and flux are charged and in which said preheated and prereduced iron ore is smelted and reduced, said smelting reduction furnace means having a bottom wall and side walls;
- a top blow oxygen lance having decarburizing nozzles and post-combustion nozzles at one end thereof for blowing oxygen into molten metal contained in said smelting reduction furnace means;
- at least one side tuyere disposed in a side wall of the smelting reduction means and at least one bottom tuyere disposed at the bottom of the smelting reduction furnace means through which a stirring gas is blown through molten metal contained in the smelting reduction furnace means to cause a portion of the upper surface of the molten metal to swell upwardly, at least a part of said stirring gas blown through said at least one side tuyere being directed at the upwardly swollen portion of the molten metal to agitate said molten metal; and
- at least one upgrading tuyere through which a gas upgrading agent is blown to an infurnace gas generated from said smelting reduction furnace means, said upgrading tuyere being disposed in a wind box of said preheat and prereduction furnace means.

12. The apparatus of claim 11, wherein said apparatus further comprises a means for separating dust from an exhaust gas discharged from the preheat and prereduction furnace means and a means for blowing the separated dust to the smelting reduction furnace means.

* * * * *